Figure 1:
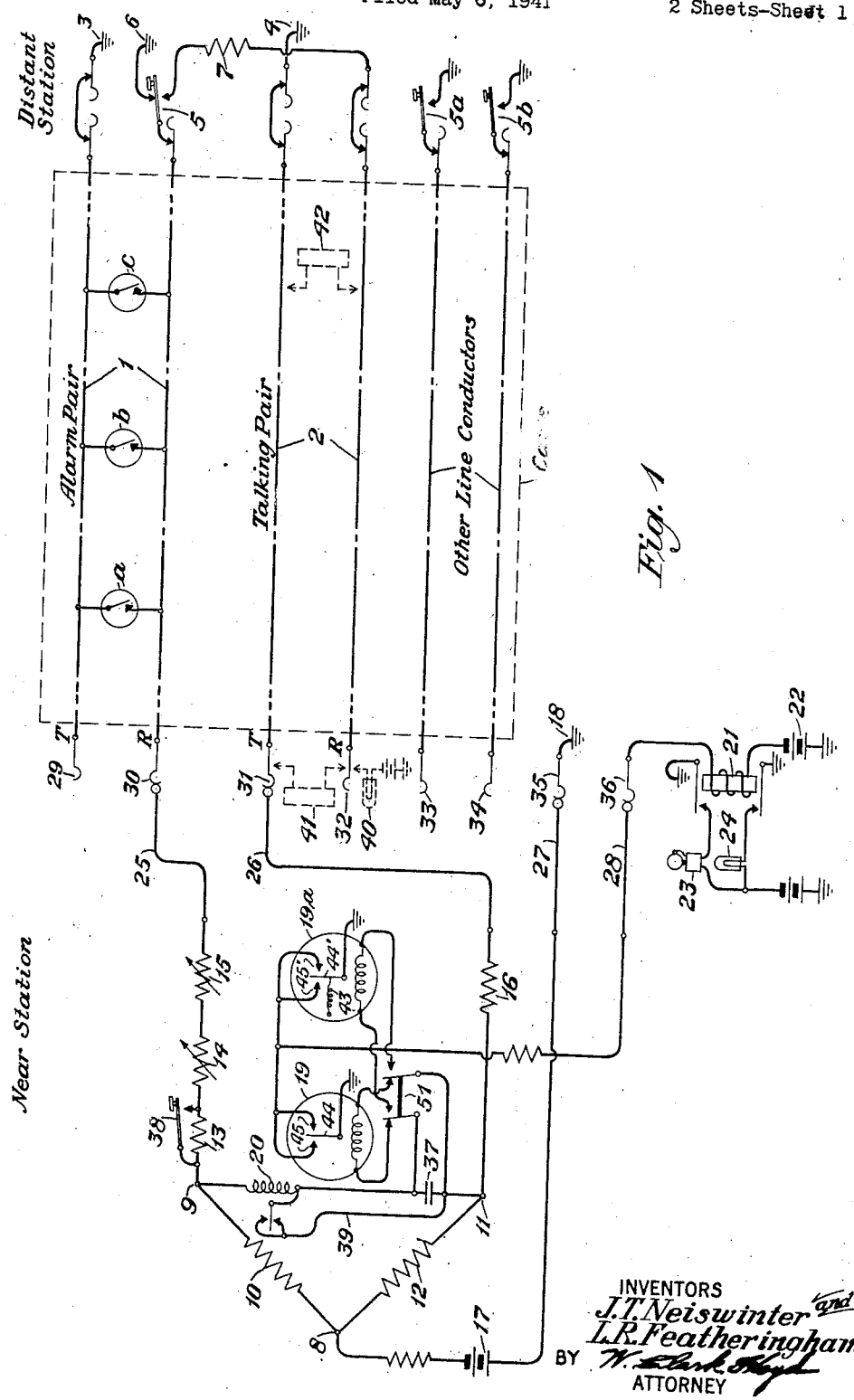

Jan. 12, 1943.  J. T. NEISWINTER ET AL  2,307,896
SYSTEM FOR INDICATING CIRCUIT FAULTS IN TRANSMISSION SYSTEMS
Filed May 6, 1941  2 Sheets-Sheet 2
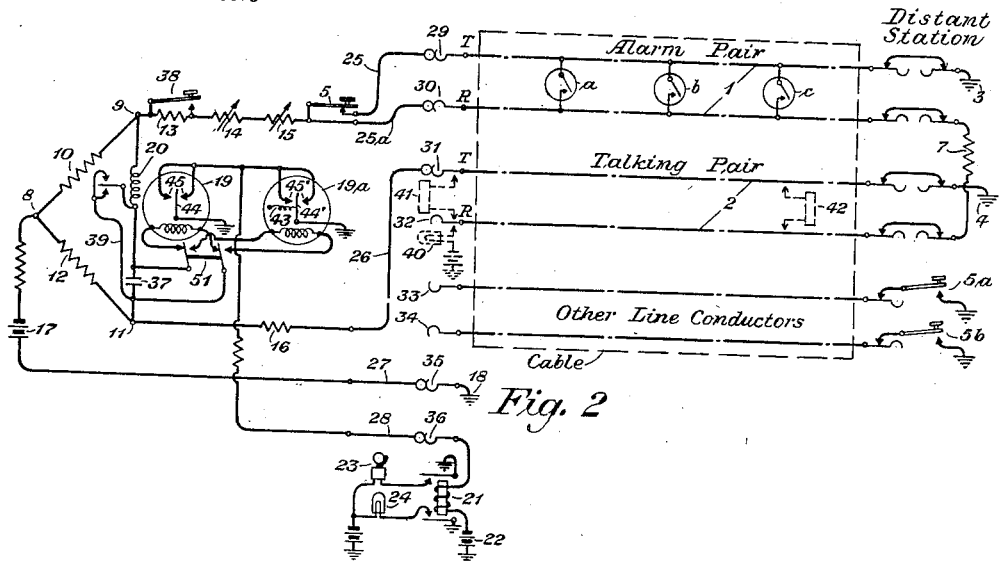
Fig. 2
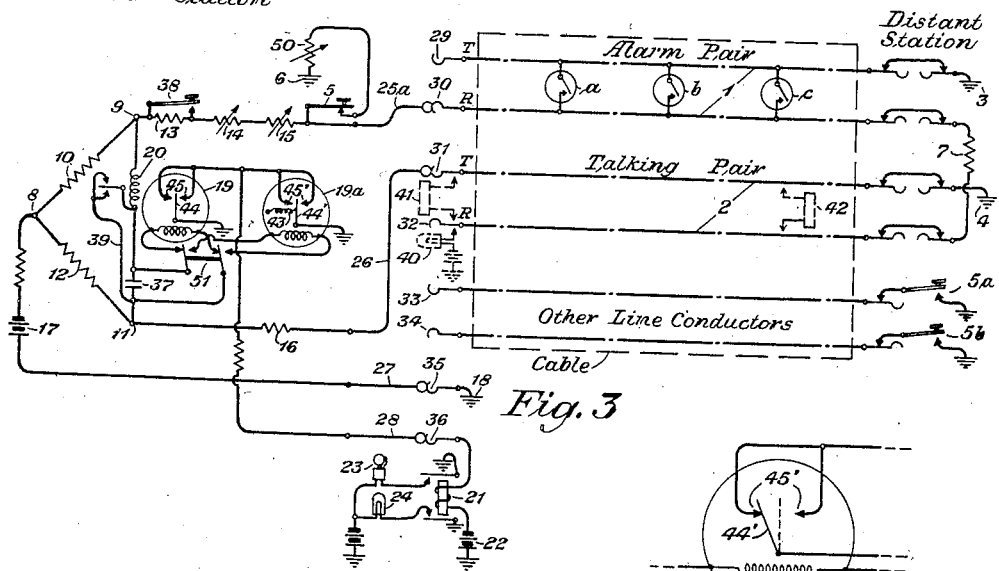
Fig. 3
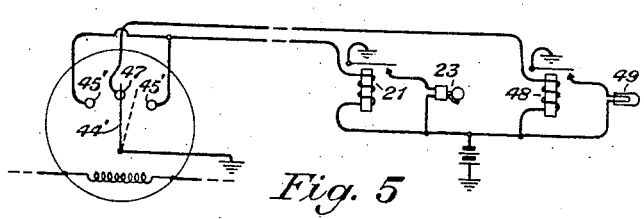
Fig. 4
Fig. 5
INVENTORS
J. T. Neiswinter and
BY L. R. Featheringham
ATTORNEY Patented Jan. 12, 1943

2,307,896

UNITED STATES PATENT OFFICE 2,307,896

SYSTEM FOR INDICATING CIRCUIT FAULTS IN TRANSMISSION SYSTEMS

James T. Neiswinter, North Olmstead, and Lee Roy Featheringham, Parma, Ohio, assignors to American Telephone and Telegraph Company, a corporation of New York Application May 6, 1941, Serial No. 392,106

19 Claims. (Cl. 179—175.3)

This invention relates to indicating means and more particularly to means for indicating the occurrence and location of circuit faults in electrical transmission systems and the existence of conditions likely to cause such circuit faults.

Transmission lines, especially long ones, are subject to certain hazards, such as undesired grounds, opens and short-circuits, which interfere with or disrupt service thereover. It is, of course, desirable that the operating or maintenance personnel at the terminal stations or substations of the system be immediately apprised of the occurrence of such faults. It frequently happens, however, that due to the characteristics of the circuit or to the temporary non-use thereof, the occurrence thereof does not become known to said personnel until an interference with or disruption of the service is reported by an operator, for example. Transmission lines, even when they form a part of cable circuits, are subject to these hazards, due for example, to undiscovered defects in the cable sheath resulting from manufacture or to natural deterioration thereof when in use or to cracks or punctures therein caused by external forces. When such defects exist in or such injuries occur to the cable sheath, moisture seeps into the cable and causes deterioration of the conductor insulation which in turn results in the grounding or short-circuiting of the conductors. It is equally desirable that the existence of such defects in or the occurrence of such injuries to the cable sheath become known to said personnel as soon as possible so that the actual occurrence of circuit faults can be prevented.

To guard against disruption of service over cable circuits, the cables have in many instances been filled with gas maintained at a substantially constant pressure. When a fault in the cable sheath exists or occurs, the gas escaping through the fault, in general, keeps out the moisture as long as the pressure within the cable exceeds or equals the atmospheric or water pressure outside the cable and thus delays the actual grounding or short-circuiting of the cable conductors for a substantial period of time. Alarm systems have been devised which give an alarm to the operating or maintenance personnel when the pressure in such gas-filled cables drops below a predetermined level. In such systems low pressure alarm contactors, for example, of the type disclosed in Patent No. 1,936,194, issued to T. C. Henneberger et al., have been connected at intervals along the cable across a pair of a spare quad (usually called the "alarm pair"), the other pair of the quad or another pair in the cable (usually called the "talking pair") being set aside for communication between the terminal station attendants and the repair man or for use in connection with the alarm circuit or for both. As a result of the escape of the gas, the pressure is lowered more rapidly and to a greater degree in the proximity of the sheath fault. This decrease in pressure causes the operation of the nearest contactor which, in operating, connects together the tip and ring sides of the alarm pair at that point and causes the operation of a relay connected in series with said pair at the terminal station. The operation of the relay closes the circuit of a bell or lamp. Examples of this type of alarm system are disclosed in Patents Nos. 1,855,321 and 1,904,227, issued to S. P. Shackleton and T. C. Henneberger, respectively.

These previously used systems are subject to several rather important limitations. In the first place, they are limited either to use with gas-filled cable circuits for indicating the operation of a contactor, or to use with other types of transmission circuits for indicating merely the occurence of a short-circuit across the pair of conductors being supervised. No indication or alarm was given upon the occurrence of an undesired ground or opening of the circuit or upon the failure of voltage in the system. In the second place, the operation of the first contactor, or the occurrence of the first short-circuit, rendered the alarm system incapable of further use until after the operated contactor had been released by the repair man when he repaired the cable sheath and restored the gas pressure to normal, or until after he had removed the short-circuit. During this interval, in order to determine whether any other contactors had operated, or other short-circuits had occurred, and in order to determine the location thereof, it was necessary for the maintenance or operating personnel at the terminal station or the substation to disconnect the alarm circuit, connect testing apparatus to the alarm and talking pairs, or analogous circuits, and make periodic tests thereof. In practice, these tests were made hourly and not only demanded the intermittent attention of said personnel, but also required the expenditure of a considerable amount of time and effort in making them. Furthermore, in following this routine of making hourly tests, a delay of as much as an hour was sometimes incurred in discovering the fact that another contactor had operated, or another short-circuit had occurred.

One object of the present invention is to provide an improved system for automatically and immediately giving an alarm or other indication that a fault exists in the sheath of a gas-filled cable which is likely to cause the grounding or short-circuiting of the conductors of said cable. Another object is to provide an alarm system for a gas-filled cable circuit of the general type described above which automatically and immediately gives an alarm or other indication upon the operation of other contactors after the first, or upon the release of a contactor after its operation. Another object is to provide an alarm system which is applicable to transmission circuits in general and which indicates the occurrence not only of short-circuits across the line conductors, but also of other types of circuit faults such as undesired grounds and opens. Another object is to provide such a system which is capable of giving an alarm upon the failure of voltage or the occurrence of current surges in the system. Still another object is to provide such a system which, in itself, indicates or can be employed to indicate the location of such circuit faults or operated contactors. Other objects and features of the invention will be apparent from the description hereinafter following.

For descriptive purposes the invention may be viewed as a novel application of the Wheatstone bridge principle. In general, the system and apparatus include two fixed resistances which form the ratio arms of the bridge; a variable resistance or rheostat which forms a part of the balance arm of the bridge; the several conductors of the circuits under supervision which form the unknown resistance arm and the remaining part of the balance arm of the bridge; switches or the like for switching said conductors, or parts thereof, into and out of the system in various predetermined ways to form the balance and unknown resistance arms of the bridge, or parts thereof, and to place the system in operative condition to perform its intended functions; a source of potential adapted to be connected in one of the conjugate circuits of the bridge, i. e. between two of the juncture points of the bridge arms; a current responsive device connected in the other conjugate circuit of the bridge, i. e. between the other two juncture points of the bridge arms; and an alarm or indicating means controlled by the current responsive device.

The drawings illustrate schematically the invention as applied to gas-filled cable systems of the general type referred to above which are used for the transmission of telephone or telegraph signals, or both. While the invention is shown and described in connection with this type of system with which its use is particularly advantageous, it is to be understood that it is also applicable to other types of telephone or telegraph circuits and to other types of transmission circuits in general. Figures 1 to 3 of the drawings illustrate three embodiments of the invention; Figs. 4 and 5 illustrate modifications of the current responsive means which may be employed in said embodiments.

In Fig. 1 of the drawings three pairs of the line conductors of the system are shown, one of which is an alarm or testing pair 1 and another a talking or auxiliary pair 2. The tip and ring conductors of the latter pairs are designated T and R, respectively. The latter pairs are preferably the two pairs of a quad or two pairs of the same cable, but may be pairs of different but parallel cables extending between the two stations. In the embodiment shown, the cable is filled with gas normally maintained at substantially constant pressure. Connected across the alarm pair are a number of low pressure alarm devices a, b and c which may be of the short-circuiting type disclosed in the above-mentioned patent to T. C. Henneberger et al. Each of these devices or contactors, any number of which may be located at predetermined points along the cable, is adapted to establish a connection across the conductors of the alarm pair when the gas pressure in the vicinity thereof falls below a predetermined level due, for example, to a fault in the cable sheath. At the distant station the tip conductors of the alarm and talking pairs are connected to ground at 3 and 4, respectively. A switch 5 is provided for connecting the ring conductor of the alarm pair to ground at 6 or to the ring conductor of the talking pair through resistance 7, for purposes hereinafter pointed out. Normally, when the system is set to give an indication or alarm upon the operation of the first contactor, switch 5 is in the position shown and connects the ring conductor of the alarm pair to ground at 6. Thereafter, when the system is set to perform its other functions said switch is generally operated to its lower position and connects said conductor through resistance 7 to the ring conductor of the talking pair. Switches 5a and 5b may be provided for connecting other line conductors of the system to ground, if desired. The functions of resistance 7 and devices 40, 41 and 42 are hereinafter described.

The remainder of the system and apparatus shown is located at the near station. As stated above, the apparatus and circuits forming the invention may be viewed, in a fundamental sense, as a Wheatstone bridge arrangement. The arm corresponding to one ratio arm extends from juncture point 8 to juncture point 9 and includes resistance 10. The arm corresponding to the other ratio arm extends from juncture point 8 to juncture point 11 and includes resistance 12. Resistances 10 and 12 may, for convenience, be equal. The arm corresponding to the balance arm, when the system is set for indicating the operation of the first contactor, extends from juncture point 9 to ground 6 at the distant station and includes resistance 13, rheostats 14 and 15, and the ring conductor of the alarm pair. The arm corresponding to the unknown resistance arm extends from juncture point 11 to ground 4 at the distant station and includes resistance 16 and the tip conductor of the talking pair. The battery circuit, when the system is set to perform the above-stated function, extends from juncture point 8 to the juncture point of the balance and unknown resistance arms formed by ground connections 4 and 6 at the distant station and includes potential source 17 and ground connection 18 at the near station and ground connections 4 and 6 at the distant station. Connected between the two remaining juncture points, that is, 9 and 11, are a current responsive device 19, a protective device or overload relay 20 and a condenser 37. The local alarm circuit includes the grounded armature of the current responsive device, the contacts thereof, relay 21 and grounded battery 22, the armatures and contacts of the latter relay being adapted, when operated, to close the circuits of one or more alarm or indicating means such as bell 23 or lamp 24. The means for making the various connections at the near station are shown schematically as plug cords 25 to 28 and jack connections 29 to 36.

The current responsive device should, in general, be sufficiently sensitive to respond to the smallest current that may flow between juncture points 9 and 11 as a result of an unbalance in the system caused by the operation or release of a contactor. The degree of sensitivity depends upon many factors including, among others, the type of transmission system to which the invention is applied, the magnitude of potential source 17 and of the various resistances at the near station, the conductor resistance of the alarm and talking pairs, the number and location of the contactors and the distance between the contactors. On the other hand, said device should be sufficiently sturdy to withstand the maximum current that might flow between said juncture points as a result of such unbalances and if no protective device is used, as the result of current surges due to external potentials. In the type of transmission system to which the invention is shown as being applied, said device should preferably be sufficiently sensitive to operate on a current across said juncture points produced by an unbalance of about 20 ohms. Such a current would be relatively small and hence said device is shown as a galvanometer relay of the type shown at 19 or 19a. Another advantage in employing a galvanometer relay is that it can be used to furnish a visual indication of whether or not the bridge arrangement is properly balanced to perform its intended functions. Other types of current responsive devices may be used which may or may not provide this visual indication. If a type is used which does not give this indication, an ordinary galvanometer, or voltmeter may be temporarily connected in the circuit while the arrangement is being balanced.

Where a relatively sensitive current responsive device such as a galvanometer relay is used, it is advantageous to provide in association therewith some means to protect it against the flow of too great a current therethrough, for example, current surges caused by external potentials. The protective device shown is the overload relay 20. If a protective device of this type is used, it should, in general, be rapid in operation and of such design that it operates on current of such magnitude as is likely to cause injury to the current responsive device but not on a current of such magnitude as may flow through juncture points 9 and 11 as the result of an unbalance in the system caused by the operation or release of a contactor. It should also be of relatively low resistance so as not to reduce the current through the winding of the current responsive device to an extent sufficient to interfere with the operation thereof, and further should be sufficiently sturdy to withstand relatively large currents. In the type of transmission system to which the invention is shown as being applied, the use of a polar relay of the type commonly employed in telegraph systems is advantageous. The operating winding of this relay is connected between the juncture points 9 and 11 and in series with the winding of the current responsive device. When too great a current flows across said juncture points relay 20 quickly operates and closes a shunt circuit around the winding of the current responsive device, said shunt circuit comprising conductor 39 and the armature and one of the contacts of relay 20. Where there is little or no danger of such injury to the current responsive device the protective device and its circuit may, of course, be omitted. As a protection against false operation of the current responsive device that may be caused by induced currents, for example, such as telegraph cross-fire, a condenser 37 may also be provided in parallel with the winding thereof in order to by-pass said currents.

Rheostat 15 in one arm of the bridge arrangement and resistance 16 in another arm, are provided as a means for making both plus and minus correction, so to speak, for any slight difference in resistance of the line conductors. The maximum resistance that can be introduced into the circuit by rheostat 15 preferably should be greater than resistance 16, for example, twice as great. When said rheostat is normally set approximately at its midpoint it can be adjusted to introduce more resistance if, for example, the resistance of the ring conductor of the alarm pair is slightly less than that of the tip conductor of the talking pair, or can be adjusted to introduce less resistance if the resistance of the former is greater than that of the latter. The use of rheostat 15 in addition to rheostat 14 also provides for coarse and fine adjustment to facilitate bridge balancing. As a further aid in setting the arrangement for operation, a test key 38 and resistance 13 are provided to test the sensitivity of operation after balance is obtained. After the arms have been brought into balance the momentary operation of key 38 shunts resistance 13, thus causing an unbalance in the system by an amount commensurate with the magnitude of said resistance. This should cause a flow of current across juncture points 9 and 11 of a magnitude sufficient to operate the current responsive device and hence, cause the operation of alarm devices 23 and 24. To insure a safe operating margin the magnitude of resistance 13 should be slightly less than the resistance variation caused by the operation or release of a contactor.

Resistance 7 at the distant station is a relatively high resistance and is provided to facilitate the use of the talking pair for communication between the repair man and the operating or maintenance personnel at the terminal stations or substations. When it is desired to use the talking pair for this purpose, a calling-in signal 40, an operator's telephone set 41, and the repair man's telephone set 42, all shown diagrammatically in dotted lines, may be associated with the talking pair as indicated in drawings. Resistance 7 is provided to prevent the operation of switch 5, following the operation of a contactor, from causing the operation of said calling-in signal and to prevent an operated contactor near the distant station from shunting the repair man's talking set to any appreciable degree when it is connected across the talking pair for communication purposes after the operation of said switch.

The operation of the system will now be described with reference to Fig. 1 with switch 51 in the position shown. Let it be assumed that none of the contactors has operated. The system is connected up as shown in the drawings and is brought into balance by adjusting rheostats 14 and 15, the reading of said rheostats being noted. The resistance of the arm between juncture points 8 and 9 now bears the same ratio to the resistance of the arm between point 9 and ground 6 as the resistance of the arm between points 8 and 11 bears to the resistance of the arm between point 11 and ground 4. Hence no current flows in the circuit connected between juncture points 9 and 11 and current responsive device 19 remains unoperated. When a contactor, for example, b, operates, that part of the tip conductor of the alarm pair between the distant station and the operated contactor is automatically connected in parallel with the corresponding part of the ring conductor of said pair, and hence the system becomes unbalanced. Current responsive device 19 operates and causes the operation of relay 21 and the alarm devices 23 and 24. The attendant at the near station adjusts rheostats 14 and 15 to bring the system back into balance and makes a note of the reading thereof.

The connection of the second line conductor segment (in this case the tip conductor segment between the operated contactor and the distant station) in parallel with the first line conductor segment (in this case the corresponding ring conductor segment) upon the operation of the contactor decreases the resistance of the arm by an amount equal to the difference between the resistance of the first line conductor segment and the combined resistance of both said line conductor segments. Rebalancing the system after the operation of the contactor restores this amount of resistance to the arm. Therefore, where $x$ equals the resistance of the first line conductor segment and $y$ equals the resistance of the second line conductor segment, and D equals the difference between the rheostat reading taken prior to the operation of the contactor and the reading taken when the system is rebalanced after the operation of said contactor.

$$x - \frac{xy}{x+y} = D$$

Since the resistance of each of said line conductors is known or can be readily ascertained and is uniformly distributed (with respect to each other) along said conductors, the ratio which the resistance of one bears to that of the other is known or can be readily ascertained. Generally this ratio is unity, or substantially so, but it may be some other ratio. With D and this ratio known, the above equation can be solved for either $x$ or $y$ to determine the resistance of either line conductor segment. From this the percentage distance and location of the operated contactor can be computed. For example, if $x$ and $y$ are substantially equal, as is usually the case, and if D is 500 ohms, then $x$ is equal to twice D or 1000 ohms. If, for example, the known line conductor resistance is 2000 ohms and there are three equally spaced contactors, the resistance of each line conductor between the contactors is 500 ohms and the operated contactor is the second one from the distant station, or contactor $b$. It would also be apparent from these values that the operated contactor is at a point 50% of the distance from the distant station to the near station. Stated in terms of miles, the operated contactor would be 5 miles from the distant station if the distance between the two stations were 10 miles.

After the system has been rebalanced, following the operation of the first contactor, the attendant at the distant station is notified to operate switch 5 to disconnect ground 6 and connect the ring conductor of the alarm pair to the ring conductor of the talking pair through resistance 7. The balance arm of the system now extends from juncture point 9 to ground 3 at the distant station and includes the ring conductor of the alarm pair from the near station to the operated contactor and the tip conductor of said pair from said contactor to the distant station. The operation of key 5 unbalances the system and causes the operation of the alarm devices thus indicating to the attendant at the near station that switch 5 has been operated. The system is again brought into balance by adjusting rheostats 14 and 15 and the reading thereof is again noted.

After the operated contactor has been located, a repair man is dispatched to the scene to repair the cable sheath. If another contactor operates during the interval between the rebalancing of the system following the operation of the first contactor and the time when the cable sheath is repaired, the system will again become unbalanced and the alarm devices will be operated. If, for example, contactor $c$ operates during this interval the segment of the ring conductor of the alarm pair between the operated contactors is automatically connected in parallel with the corresponding segment of the tip conductor of said pair thus causing the system to become unbalanced and the alarm devices to be operated. The attendant at the near station again adjusts rheostats 14 and 15 to balance the system and makes a note of the reading thereof. By substituting the difference between the last two rheostat readings for D in the equation given above, and by expressing $y$ in terms of $x$ in accordance with their known ratio, the resistance of the first line conductor segment (in this case the tip conductor of the alarm pair between the operated contactors) is ascertained. From this value the location of the second operated contactor can be determined.

If, during said interval, the release of contactor $b$ rather than the operation of contactor $c$ had occurred, said release would also have caused the system to become unblanaced and the alarm devices to be operated. In this case, however, the unbalancing of the system would be due to the opening of the circuit at the contactor and no subsequent adjustment of rheostats 14 and 15 could be made which would rebalance the system. The latter fact would indicate the release of the operated contactor and the attendant would restore the system to its original condition, as shown in the drawing.

The operation of the system and the procedure of the attendant upon the operation of other contactors subsequent to the second, or upon the release of an operated contactor subsequent to the operation of the second are, in general, the same as the operation and procedure described above. The subsequent release of a contactor can be distinguished from the subsequent operation of another contactor by comparing the rheostat readings. If the reading taken when the system is rebalanced, following the operation of the alarm devices, is greater than the previous reading, the operation of the alarm was caused by the operation of another contactor. If said reading is less than the previous reading, the operation of the alarm was caused by the release of an operated contactor. The difference in these readings can be used in the manner described above in order to determine the location of the contactor.

Figs. 2 and 3 illustrate modifications of the system shown in Fig. 1. In both of the modifications switch 5 is located at the near station in order to make it unnecessary after the operation of the first contactor for the attendant thereat to notify the attendant at the distant station to operate the switch. This facilitates the use of the invention in systems in which the distant station is unattended. Also in both modifications the ring conductors of the alarm and talking pairs are interconnected at the distant station through resistance 7.

In Fig. 2, when the system is set for indicating the operation of the first contactor, switch 5 is in the position shown and connects the tip conductor of the alarm pair in the balance arm of the bridge. An additional plug cord 25a is also provided at the near station for connecting terminal 30 of the ring conductor of the alarm pair to said balance arm. The operation of the first contactor connects in parallel the segments of the tip and ring conductors of the alarm pair which extend from the near station to the operated contactor. After the operation of the first contactor when the system is set for indicating the release of said contactor or the subsequent operation of others, the attendant at the near station operates switch 5 to disconnect terminal 29 of the tip conductor of the alarm pair from the balance arm. The circuit is now the same as that in Fig. 1 at the corresponding time and the further operation of the system is substantially the same.

In Fig. 3, when the system is set for indicating the operation of the first contactor, switch 5 is in the position shown and connects a local circuit at the near station in the balance arm of the bridge. As shown, this local circuit includes variable resistance 50 and ground connection 6. The magnitude of resistance 50 is such that the bridge may be conveniently balanced. The value selected may be substantially the same as the line conductor resistance. As in Fig. 2, an additional plug cord 25a is provided for connecting terminal 30 to the balance arm. The operation of the first contactor connects the ring conductor segment of the alarm pair from the near station to the operated contactor and the tip conductor segment of said pair from the operated contactor to the distant station in parallel with the local circuit and causes the unbalancing of the bridge. To set the system for indicating the release of said contactor or the subsequent operation of others, the attendant at the near station operates switch 5 to disconnect the local circuit, which places the system in the same condition as described above in connection with Figs. 1 and 2.

It has been found advantageous to arrange and adjust the system so that an alarm can also be given upon the failure of current across the terminals of the current responsive means. Such failure may be caused, for example, by a failure of voltage or the opening of a current path in the system or by the operation of the protective or overload device 20. For this purpose an alternative form of current responsive means 19a is shown in Figs. 1–3 with a switch 51 for substituting it in the system for that shown at 19. Current responsive means 19a has a biasing spring 43 to hold or move its armature 44' against one of the contacts 45' when no current flows across its terminals. Other alternative forms are shown in Figs. 4 and 5. In Fig. 4 a biasing winding 46 is shown in place of spring 43. In the form shown in Fig. 5 no biasing means is provided, but an additional contact 47 is provided in such position that armature 44' is in contact therewith when no current flows across said terminals. The latter form also permits differentiation to be made between an alarm given upon the failure of current across said terminals and one given upon the occurrence or removal of a fault on the line conductors. As shown, armature 44' moves to a position in contact with contact 47 in response to a failure of current and causes the operation of relay 48 and the lighting of lamp 49, whereas it moves to a position in contact with one of contacts 45' upon the occurrence or removal of a line fault and causes the operation of relay 21 and bell 23. When any one of the alternative forms is employed, the bridge arrangement is adjusted when set for operation so that it is slightly off-balance, i. e., it is unbalanced to a degree sufficient to create a slight difference of potential as between points 9 and 11 and thus cause the movement of armature 44' to a position away from all of said contacts. The subsequent occurrence of a fault on a line conductor will cause a further unbalance of the bridge arrangement to such a degree as to cause the movement of said armature to a position against one of contacts 45'. Any failure of current across the terminals of the current responsive device will cause said armature to move to a position against the left one of contacts 45' in case the alternative forms shown in Figs. 1–4 are used or to its midposition in contact with contact 47 in case the form shown in Fig. 5 is used.

Since the invention broadly includes the use in the system of any of these forms, it is to be understood that where in any of the claims hereof the term "Wheatstone" or "balance" or any like term is used in describing the bridge arrangement or the expression "for substantially balancing" or any like expression is used in describing the bridge adjusting means, such terms are not to be construed as limiting the invention defined by any such claim to a system in which the bridge arrangement is balanced as nearly as it is possible to do so to the exclusion of a system in which the bridge arrangement is so adjusted as to be slightly off-balance for the purposes described above. Likewise, where in any of the claims hereof the expression "of substantially equal potential" or any like expression is used in describing points on the bridge arms or the parallel circuit branches formed thereby, it is to be understood that the points so described may be of slightly different potentials as described above.

It should be apparent from the above description that the same general principles of operation and procedure also apply where undesired grounds, opens or ordinary short-circuits occur in the type of transmission system described above, or in other types of transmission systems. In such cases the alarm or indicating devices are operated upon the occurrence or removal of such circuit faults, and the type and location thereof can be determined from the rheostat readings or line tests, depending upon the type and characteristics of the transmission system to which the invention is applied. It should also be apparent that the invention is not limited to the particular connections shown and described above so long as its fundamental principle of operation is retained; for example, the line conductors may be connected to ground at the distant station at all times; or full metallic connections may be employed for all the various conductors; or line conductors (or parts thereof), different from those shown and described, may be balanced against one another. Also, the invention may be used merely to supplement, rather than supersede, the prior alarm systems described above, in which case the relays or relay windings of said prior systems would be disconnected after the operation of the first contactor and the present system connected to the transmission system in such manner (as described above) that it will give an indication or alarm upon the operation of a second contactor. In short, other modifications and applications of the invention than those shown and described may be employed without depart-

What is claimed is:

1. In an electrical transmission system having a plurality of conductors extending between the stations thereof, in combination, a Wheatstone bridge arrangement having a plurality of said conductors associated with certain of the arms thereof, a source of potential connected between two juncture points of said arms, current responsive means associated with said bridge arrangement and adapted to operate in response to any unbalance of said bridge arrangement caused by faults on the conductors of said system, and alarm means controlled by and adapted to give an alarm upon the operation of said current responsive means.

2. In an electrical transmission system having a plurality of line conductors extending between a plurality of stations, in combination, a balance bridge arrangement having one of said line conductors connected in one of the arms thereof and another of said line conductors associated with another of said arms, a source of potential connected in one of the conjugate circuits, of said bridge arrangement, means for connecting another of said line conductors to one of the latter arms at one of said stations, current responsive means connected in the other conjugate circuit of said bridge arrangement and adapted to operate in response to any unbalance of said bridge arrangement caused by faults on the line conductors of said system, and alarm means controlled by and adapted to give an alarm upon the operation of said current responsive means.

3. In an electrical transmission system having a plurality of line conductors extending between a plurality of stations, in combination, a parallel circuit having a plurality of branches, each branch having a resistance connected therein and a line conductor of said system associated therewith, a source of potential connected between the juncture points of said branches, means at one of said stations for connecting another line conductor of said system to one of said branches, current responsive means connected between points of substantially equal potential on said branches and adapted to operate in response to any difference of potential between said latter points caused by faults on the line conductors of said system, and alarm means controlled by and adapted to give an alarm upon the operation of said current responsive means.

4. In an electrical transmission system having a plurality of line conductors, in combination, a balance bridge arrangement having a line conductor of said system associated with one of the arms thereof, a source of potential connected in one of the conjugate circuits of said bridge arrangement, current responsive means connected in the other conjugate circuit of said bridge arrangement, said means including a movable member controlled thereby and adapted to move to predetermined positions upon the absence of current across the terminals of said means and upon the occurrence of any unbalance of said bridge arrangement caused by faults on the line conductors of said system, and means for unbalancing said bridge arrangement to a degree sufficient to cause said movable member to move to a position away from said predetermined positions to condition said arrangement for indicating the absence of current across the terminals of said current responsive means or any further unbalance of said bridge arrangement caused by faults on the line conductors of said system.

5. In a gas-filled cable transmission system having a testing pair and an auxiliary pair of conductors extending between a plurality of stations and a plurality of gas pressure devices located at points along said testing pair, in combination, a Wheatstone bridge arrangement having a pair of resistances connected in two of the arms thereof, a conductor of said testing pair connected in the third arm thereof and a conductor of said auxiliary pair connected in the fourth arm thereof, means at one of said stations for connecting the other conductor of said testing pair to the juncture point of the latter two arms, a source of potential connected in one of the conjugate circuits of said bridge, current responsive means connected in the other conjugate circuit of said bridge and adapted to operate in response to any unbalance of said bridge caused by the operation of said devices, and alarm means controlled by and adapted to give an alarm upon the operation of said current responsive means.

6. In a gas-filled cable transmission system having a testing pair and an auxiliary pair of conductors extending between a near station and a distant station and a plurality of gas pressure devices located at points along said testing pair, in combination, a parallel circuit having a plurality of branches, one branch including a resistance and a conductor of said testing pair and another branch including a second resistance and a conductor of said auxiliary pair, a source of potential connected between the juncture points of said branches, means at the near station for connecting the other conductor of said testing pair to one of said branches at a point intermediate the juncture points thereof, means associated with said parallel circuit for rendering a predetermined point on one of its branches of substantially equal potential with respect to a predetermined point on said other branch, and current responsive means connected between said predetermined points for indicating any difference of potential as between said predetermined points caused by the operation or release of any of said gas pressure devices.

7. In a gas-filled cable transmission system having a testing pair of conductors, an auxiliary pair of conductors and a plurality of gas pressure devices located at points along said testing pair and adapted to short-circuit the latter pair at said points when the gas pressure in the vicinity thereof falls below a predetermined level, in combination, a Wheatstone bridge arrangement having a pair of resistances connected in the ratio arms thereof, a conductor of said testing pair connected in the balance arm thereof and a conductor of said auxiliary pair connected in the unknown-resistance arm thereof, means for connecting the other conductor of said testing pair to the juncture point of said balance and unknown-resistance arms, a source of potential connected in one of the conjugate circuits of said bridge, current responsive means connected in the other conjugate circuit of said bridge for indicating any unbalance thereof caused by the operation of a first one of said devices or by the subsequent operation of others, and means for disconnecting said first mentioned conductor of said testing pair from the juncture point of said balance and unknown-resistance arms after the operation of a first one of said devices.

8. In a gas-filled cable communication system having a testing pair and an auxiliary pair of conductors extending between a near station and a distant station and a plurality of gas pressure short-circuiting devices located at points along said testing pair, in combination, a Wheatstone bridge arrangement having a pair of resistances connected in two of the arms threof at the near station, a conductor of said testing pair connected in the third arm thereof and a conductor of said auxiliary pair connected in the fourth arm thereof, means for connecting the other conductor of said testing pair to the juncture point of the latter two arms at the distant station, a source of potential connected in one of the conjugate circuits of said bridge, means associated with one of said arms at the near station for substantially balancing said bridge, current responsive means at the near station connected in the other conjugate circuit of said bridge for indicating any unbalance thereof caused by the operation of a first one of said devices or by the subsequent operation of others, high resistance means connected to the other conductor of said auxiliary pair at the distant station, and switching means at the distant station for disconnecting said first-mentioned conductor of said testing pair from the juncture point of said third and fourth arms and for connecting it to said high resistance means and said other conductor of said auxiliary pair after the operation of a first one of said short-circuiting devices or the occurrence of a short circuit across said testing pair.

9. In a gas-filled cable transmission system having a testing pair and an auxiliary pair of conductors extending between a near station and a distant station and a plurality of gas pressure devices located at points along said testing pair, in combination, a Wheatstone bridge arrangement having a pair of resistances connected in two of the arms thereof at the near station, a local circuit at the near station connected in the third arm thereof and a conductor of said auxiliary circuit connected in the fourth arm thereof, means for connecting one of the conductors of said testing pair to said third arm at a point intermediate the juncture points thereof and for connecting the other conductor of said testing pair to the juncture point of said third and fourth arms, a source of potential connected in one of the conjugate circuits of said bridge arrangement, current responsive means connected in the other conjugate circuit of said bridge arrangement for indicating any unbalance thereof caused by the operation of a first one of said devices or by the subsequent operation of others, and means for disconnecting said local circuit from said third arm after the operation of a first one of said devices.

10. In an electrical transmission system having a plurality of line conductors extending between a plurality of stations with a fault on one of said conductors at a point between said stations, in combination, a balanced circuit having a plurality of said line conductors associated with certain of the branches thereof, the latter conductors including the conductor having said fault thereon, a source of potential connected between the juncture points of said branches, current responsive means associated with said circuit and adapted to operate in response to any unbalance of said circuit caused by removal of said existing fault or the occurrence of other faults on the line conductors of said system, and alarm means controlled by and adapted to give an alarm upon the operation of said current responsive means.

11. In an electrical transmission system having a plurality of line conductors extending from a near station to a distant station and having two of said conductors short-circuited at a point between said stations, in combination, means for interconnecting at the distant station one of said short-circuited conductors and one of said conductors which is free of short-circuits, a plurality of resistances and a source of potential at the near station, means for bridging said resistances across one of the short-circuited conductors and said free conductor and for connecting said potential source between said interconnected conductors at the distant station and a point intermediate said resistances at the near station to form a parallel circuit having a plurality of branches, means for connecting another of said conductors to the juncture point of said branches at one of said stations, current responsive means connected between points of substantially equal potential on said branches and adapted to operate in response to any difference of potential between said latter points caused by the occurrence of other faults on the line conductors of said system, and alarm means controlled by and adapted to give an alarm upon the operation of said current responsive means.

12. In an electrical transmission system having a plurality of line conductors extending from a near station to a distant station and having two of said conductors short-circuited at a point between said stations, in combination, means for interconnecting at the distant station one of said short-circuited conductors and one of said conductors which is free of said short circuit, a plurality of resistances and a source of potential at the near station, means for bridging said resistances across the other short-circuited conductor and said free conductor and for connecting said potential source between said interconnected conductors at the distant station and a point intermediate said resistances at the near station to form a parallel circuit having a plurality of branches, current responsive means connected between points of substantially equal potential on said branches and adapted to operate in response to any difference of potential between said latter points caused by the occurrence of other faults on the line conductors of said system, and alarm means controlled by and adapted to give an alarm upon the operation of said current responsive means.

13. In a gas-filled cable transmission system having a plurality of cable conductors extending between a plurality of stations and an operated gas pressure device associated with one of said conductors at a point between said stations, in combination, a balanced circuit having a plurality of said conductors associated with certain of the branches thereof, the latter conductors including the conductor with which said operated device is associated, a plurality of unoperated gas pressure devices associated with one of the latter conductors at other points between said stations, the operation and release of said operated and unoperated devices being controlled by the gas pressure in the vicinity thereof to unbalance said circuit, a source of potential connected between the juncture points of said branches, current responsive means associated with said circuit and adapted to operate in response to any such unbalance, and alarm means controlled by and adapted to give an alarm upon the operation of said current responsive means.

14. In a gas-filled cable transmission system having a testing pair and an auxiliary pair of conductors extending between a near point and a distant point, an operated short-circuiting device connecting the conductors of said testing pair together at a point between said near and distant points and a plurality of unoperated short-circuiting devices located at other points along said testing pair, in combination, a Wheatstone bridge arrangement having a pair of resistances connected in two of the arms thereof, a segment of one conductor of said testing pair from the near point to said operated device and a segment of the other conductor of said testing pair from said operated device to the distant point connected in the third arm thereof and one conductor of said auxiliary pair connected in the fourth arm thereof, a source of potential connected in one of the conjugate circuits of said bridge, current responsive means connected in the other conjugate circuit of said bridge and adapted to operate in response to any unbalance of said bridge caused by the operation of any of said unoperated short-circuiting devices, and alarm means controlled by and adapted to give an alarm upon the operation of said current responsive means.

15. In a gas-filled cable communication system having a testing pair and an auxiliary pair of conductors extending between a near station and a distant station, an operated short-circuiting device interconnecting the conductors of said testing pair at a point between said stations and a plurality of unoperated short-circuiting devices located at other points along said testing pair, in combination, a Wheatstone bridge arrangement having a pair of resistances connected in its ratio arms, a segment of a conductor of said testing pair from the near station to said operated device and a segment of the other conductor of said testing pair from said operated device to the distant station connected in its balance arm and a conductor of said auxiliary pair connected in its unknown-resistance arm, a source of potential connected in one of the conjugate circuits of said bridge, high resistance means at the distant station interconnecting said first-mentioned conductor of the testing pair and the other conductor of said auxiliary pair, and current responsive means connected in the other conjugate circuit of said bridge for indicating any unbalance thereof caused by the release of said operated device, the operation of said unoperated devices or the release of the latter devices after their operation.

16. In a gas-filled cable communication system having an alarm pair and an auxiliary pair of conductors extending between a near station and a distant station, an operated short-circuiting device interconnecting the conductors of said alarm pair at a point between said stations and a plurality of unoperated short-circuiting devices located at other points along said alarm pair and adapted to interconnect the conductors of said alarm pair at said other points when the gas pressure in the vicinity thereof falls below a predetermined level, in combination, a Wheatstone bridge arrangement having a pair of resistances connected in its ratio arms, a segment of a conductor of said alarm pair from the near station to said operated device and a segment of the other conductor of the alarm pair from said operated device to the distant station connected in its balance arm and a conductor of said auxiliary pair connected in its unknown-resistance arm, a source of potential connected in one of the conjugate circuits of said bridge, means for interconnecting at the distant station said first mentioned conductor of said alarm pair and the other conductor of said auxiliary pair, means associated with said balance arm for substantially balancing said bridge, current responsive means connected in the other conjugate circuit of said bridge and adapted to provide visual indication as to whether said bridge is in its properly balanced condition and to operate in response to any current in the latter circuit resulting from any unbalance of said bridge caused by the release of said operated short-circuiting device, the operation of said unoperated short-circuiting devices or the release of the latter devices after their operation, alarm means controlled by and adapted to give an alarm upon the operation of said current responsive means, overload means associated with said current responsive means and adapted to protect it from excessive current therethrough, and condenser means connected in parallel with said current responsive means and adapted to bypass any induced current in said latter circuit.

17. In a gas-filled cable transmission system having a testing pair and an auxiliary pair of conductors and a plurality of gas pressure devices located at points along said testing pair, in combination, a Wheatstone bridge arrangement having a pair of resistances connected in two of the arms thereof, a conductor of said testing pair connected in the third arm thereof and a conductor of said auxiliary pair connected in the fourth arm thereof, a source of potential connected in one of the conjugate circuits of said bridge, current responsive means connected in the other conjugate circuit of said bridge for indicating any unbalance thereof caused by the operation of a first one of said devices or by the subsequent operation of others, and variable resistance means connected in said third arm for rebalancing said bridge after the operation of each of said devices to condition said bridge for causing the indication of the subsequent operation of other ones of said devices.

18. In an electrical transmission system having a plurality of line conductors, in combination, a Wheatstone bridge arrangement having a pair of resistances connected in two of the arms thereof, one of said line conductors connected in the third arm thereof and another one of said line conductors connected in the fourth arm thereof, a source of potential connected in one of the conjugate circuits of said bridge, current responsive means connected in the other conjugate circuit of said bridge for indicating any unbalance thereof caused by faults on the line conductors of said system, a third resistance connected in said third arm, and variable resistance means connected in said fourth arm for rebalancing said bridge after the occurrence of each such fault to condition said bridge for causing the indication of subsequently occurring faults.

19. In an electrical transmission system having a plurality of line conductors, in combination, a balance bridge arrangement having a line conductor of said system associated with one of the arms thereof, a source of potential connected in one of the conjugate circuits of said bridge arrangement, current responsive means connected in the other conjugate circuit of said bridge arrangement, said means including a movable member controlled thereby and adapted to move to a first predetermined position upon the absence of current across the terminals of said means and to other predetermined positions upon the occurrence of any unbalance of said bridge arrangement caused by faults or current surges on the line conductors of said system, means for unbalancing said bridge to a degree sufficient to cause said movable member to move to a position away from said predetermined positions, alarm means controlled by said current responsive means and adapted to be operated when said movable member moves to said first mentioned predetermined position, and additional alarm means controlled by said current responsive means and adapted to be operated when said movable member moves to said other predetermined positions.

JAMES T. NEISWINTER.
LEE ROY FEATHERINGHAM.